G. M. CARTER.
VEHICLE BRAKE.
APPLICATION FILED MAY 16, 1919.
1,347,990.
Patented July 27, 1920.
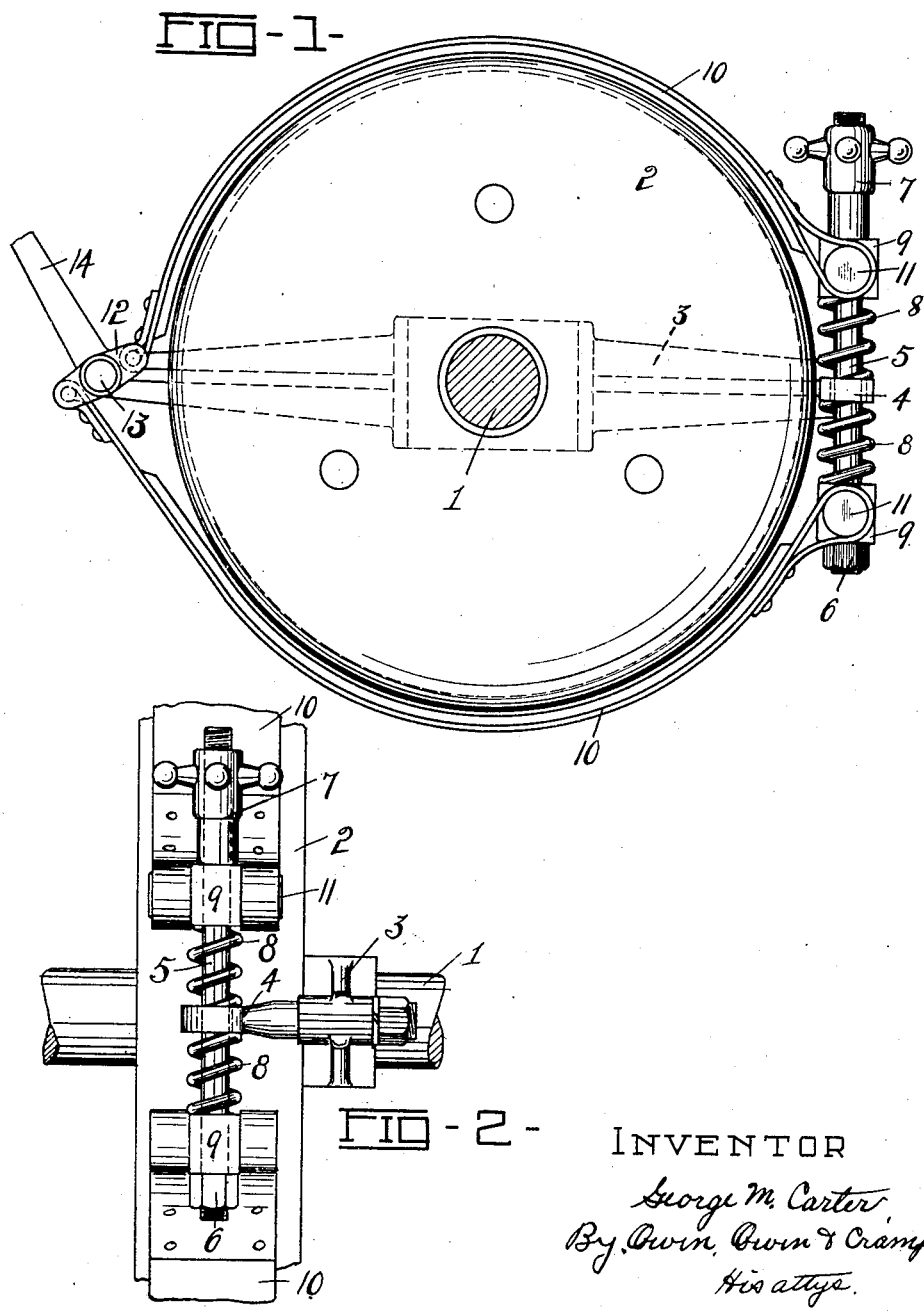

UNITED STATES PATENT OFFICE.

GEORGE M. CARTER, OF FINDLAY, OHIO, ASSIGNOR OF ONE-HALF TO RALPH H. ROSENBERG.

VEHICLE-BRAKE.

1,347,990.  Specification of Letters Patent.  Patented July 27, 1920.

Application filed May 16, 1919. Serial No. 297,598.

*To all whom it may concern:*

Be it known that I, GEORGE M. CARTER, a citizen of the United States, and a resident of Findlay, in the county of Hancock and State of Ohio, have invented a certain new and useful Vehicle-Brake.

This invention relates to brake mechanisms, and particularly to those of the band and drum type.

The object of my invention is the provision of an improved brake of the character described which is composed of separate band members relatively movable to grip or release the brake band, and connected in a manner to effect an adjustment and equalization of the pressure of the two members on the drum.

Another object of my invention is the provision of a brake of the class described, the band of which has a yielding anchoring means, whereby upon an application of the brake, either during forward or backward running, the brake band is caused to have a gradual or cushioned engagement with the drum as distinguished from a sudden engagement thereof, thus lessening or stopping the retarding shock on the vehicle and the injury to the tires occasioned thereby.

The invention is fully described in the following specification, and while in its broader aspect it is capable of embodiment in numerous forms, a preferred embodiment thereof is illustrated in the accompanying drawings, in which—
Figure 1 is a side elevation of a brake mechanism embodying my invention, with parts broken away, and Fig. 2 is a fragmentary edge view of a portion thereof.

Referring to the drawings, 1 designates a wheel driving shaft, 2 the customary brake drum for securing to the brake wheel or member (not shown), to turn therewith, and 3 an anchoring member or cross-arm having an opening, in the present instance, through which the shaft 1 extends and being anchored against turning with the shaft in any suitable manner, as for instance, by attaching to the vehicle frame or axle, as well understood in the art.
The cross-arm 3 carries an eye-bolt 4 at one end, the apertured end of which is disposed without the drum periphery in the plane of rotation thereof and a rod 5 projects loosely therethrough, both for free longitudinal and limited rocking movements relative thereto. The rod 5 is provided at one end with a head 6, in the present instance in the form of a nut, and at its other end with an adjusting nut 7, preferably of the hand-type, said head and adjusting nut being spaced from the rod carrying member 4. A coiled compression spring 8 is mounted on the rod 5 at each side of the carrying member 4, in inner end-thrust contact therewith, and the outer end-thrust of each spring is against a respective block 9 on the rod 5. One of these blocks is in engagement at its outer side with the stop part 6 and the other is in engagement at its outer side with the adjusting nut 7 and is longitudinally movable on the rod.

A brake band section 10 projects from each block 9, being attached to trunnions 11 at the opposite sides thereof, and these bands extend in opposite directions around the drum periphery and are connected at their outer ends to opposite ends of an operating lever 12, which is fulcrumed on a stud 13 projecting, in the present instance, from the opposite end of the cross-arm 3 to that which carries the rod 5. An operating arm 14 projects from the lever 12 and may be connected to any suitable control means, such for instance, as either the customary brake pedal or the emergency brake lever of a vehicle. It is evident that the connections of the brake band sections with the lever 12 are such, that a rocking of the lever in one direction will effect a tightening of the bands on the drum, and that a rocking of the lever in another direction will effect a release or loosening of the bands from the drum.

Upon an application of the brake when the drum is rotating, the brake bands will turn a short distance with the drum, due to the equalizing springs 8 permitting a movement of the rod 5 through its carrying member 4 in the direction of its turning, thus preventing a sudden gripping or locking of the brake-band the part to which applied when the brakes are quickly operated, and the consequent shock and injury to the vehicle. An adjustment of the brake-bands may be effected by turning the hand nut 7 on the rod 5.

I wish it understood that my invention is not limited to any specific construction, arrangement or form of the parts, as it is capable of numerous modifications without departing from the spirit of the claim.

Having thus described my invention, what I claim as new and desire to secure by Letters Patent is—

In a brake of the class described, a rotatable brake drum, a stationary anchorage member having a part at the periphery of the drum, a rod projected loosely through the anchorage member for longitudinal movements relative thereto in a plane tangential to the drum periphery, a pair of blocks carried by the rod one at each side of the anchorage member for movements lengthwise of the rod, a stop for each block at the respective end of the rod to limit the outward movements of the blocks, one of the stops comprising a nut member adjustable on the rod to vary the normal distance between the blocks, each of said blocks having trunnions projecting from opposite sides thereof, a coiled compression spring encircling the rod between the anchor member and each block to yieldingly equalize the position of the rod with respect to the anchor member, brake bands extending in opposite directions around the drum periphery and each having ears connected to the trunnions of a respective block, and means carried by the anchor member at the opposite side of the drum to the rod, said means connecting the opposite ends of the brake bands and operable to effect a contraction or expansion of the bands.

In testimony whereof, I have hereunto signed my name to this specification.

GEORGE M. CARTER.